United States Patent [19]

Orieux

[11] 4,208,733
[45] Jun. 17, 1980

[54] SOUND SOURCE DETECTING SYSTEMS

[75] Inventor: François Orieux, Paris, France

[73] Assignee: CSF-Compagnie Generale de Telegraphie sans Fil, Paris, France

[21] Appl. No.: 247,458

[22] Filed: Dec. 20, 1962

[51] Int. Cl.² .............................................. G01S 3/80
[52] U.S. Cl. ..................................................... 367/125
[58] Field of Search ........................... 340/3, 6, 16, 9; 343/113, 113.1, 119, 123; 324/82, 88; 367/125

[56] References Cited
U.S. PATENT DOCUMENTS

| | | | |
|---|---|---|---|
| 2,808,583 | 10/1957 | Mathes | 367/125 X |
| 3,050,728 | 8/1962 | Worley | 343/119 |
| 3,089,118 | 5/1963 | Baumann | 367/121 |

OTHER PUBLICATIONS

Seely, *Electrical & Electronic Engineering,* McGraw-Hill, 1956, (pp. 424, 425).

*Primary Examiner*—Richard A. Farley
*Attorney, Agent, or Firm*—Cushman, Darby & Cushman

EXEMPLARY CLAIM

1. A system for detecting in bearing a source of sound in a predetermined plane and for measuring the frequency of said sound comprising in combination: two hydrophone dipoles sustantially arranged in said plane, each having at least two hydrophones, the axis of said dipoles being at right angles to each other said hydrophones receiving said sound and providing output signals these hydrophones having respective axes perpendicular to said plane; means for detecting the respective phase shifts between said output signals of the same dipole and providing phase shift indicating signals; and display means having two inputs for receiving respectively said phase shift indicating signals.

5 Claims, 8 Drawing Figures

SOUND SOURCE DETECTING SYSTEMS

The present invention relates to systems for detecting the sources of sound, for example, submarine sources of sound.

In the present day technique of sound source detecting hydrophones having a generally circular directivity are used.

On of the drawbacks of such systems lies in that their actual directivity pattern is far from being rigorously circular.

It is an object of the invention to avoid this drawback.

The invention provides a system for locating in bearing a source of sound and for measuring the frequency of the sound received. This system comprises an acoustical head having two hydrophone dipoles, at right angles to each other, means for detecting the respective phase shifts between the voltages derived from the two hydrophones of the same dipole and an oscilloscope tube, to the two pairs of deflecting plates of which these voltages are applied.

The invention will be best understood from the following description and appended drawings wherein:

FIG. 3c is a detail of FIG. 3a;

The operating principle of the invention will be first set forth.

Figure 1:
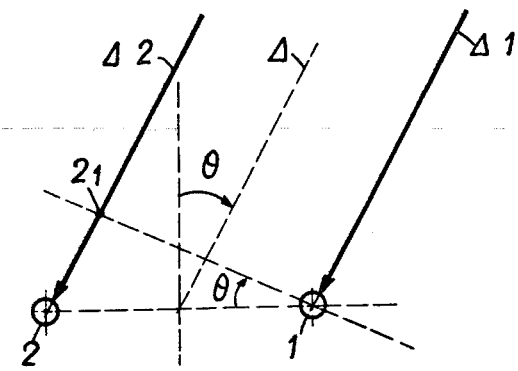
FIG. 1 shows the propagation of a plane wave towards an acoustic dipole.

FIG. 1 shows two identical hydrophones 1 and 2, arranged as an acoustic dipole. They are omnidirectional and their axes are normal to the plane of the figure.

A plane wave, propagating along the direction $\Delta$ and forming an angle $\theta$ with a line perpendicular to the base 1.2 of the acoustic dipole, reaches hydrophones 1 and 2, respectively at instants $t_1$ and $t_2$, $\theta$ being the bearing angle of the sound source in the example considered.

At instant $t_1$, the front of the plane wave is in the plane of the FIG. 1, along line $1.2_1$, forming angle $\theta$ with base 1.2.

The phase shift $\phi$ corresponding to the time elapsed between the instant $t_1$ at which the wave has reached hydrophone 1 and the instant $t_2$ at which it has reached hydrophone 2 is: $\phi_{1.2} = 2\pi \cdot (d/c) \cdot f \sin \theta$, where d is the length of base 1.2, f the frequency of the wave transmitted and c the velocity of propagation.

Figure 2:
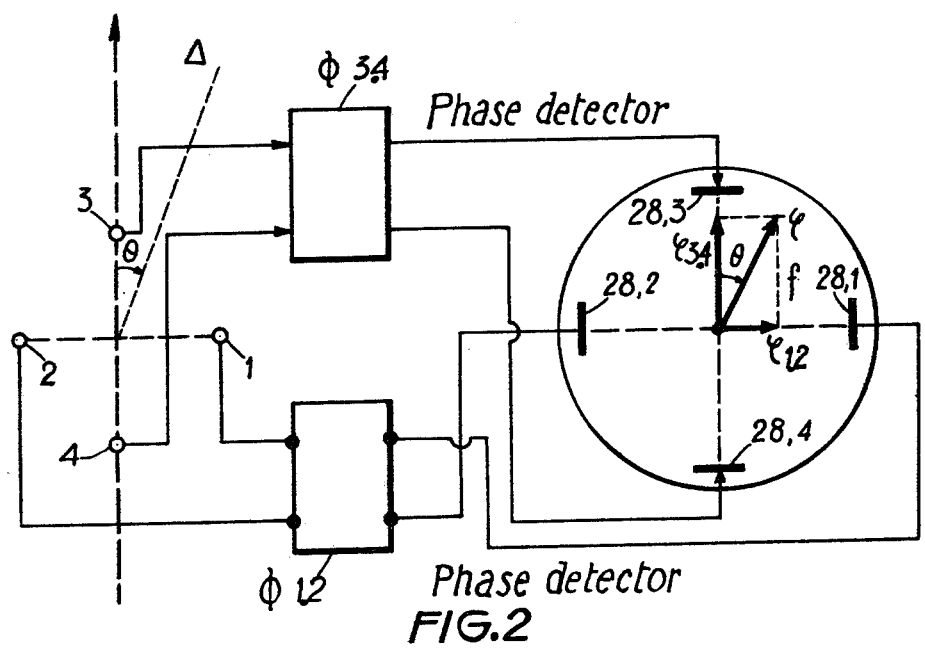
FIG. 2 illustrates, very diagrammatically, how the bearing and the frequency are displayed on the screen of an oscilloscope tube.

In FIG. 2 are shown the dipole 1.2, the base of which may be, for example, normal to the axis of the boat carrying the system, and the dipole 3-4 at right angles with dipole 1.2.

FIG. 2 is a simplified diagram of the bearing determining system of the invention, which also measures the frequency of the sound received. In this system, a phase detector $\Phi_{1.2}$ provides an output voltage which is proportional to the phase-shift $\phi_{1.2}$ between the waves, received by hydrophones 1 and 2, and a similar device $\Phi_{3.4}$ provides an output voltage proportional to the phase shift $\phi_{3.4}$ between the waves received by hydrophones 3 and 4.

The two output voltages thus obtained are applied to the pairs of plates 28.1, 28.2 and 28.3, 28.4 of an oscilloscope tube 28.

In the absence of the voltage applied to the plates the spot is at the center of the screen. In the presence of the phase-shift measuring voltages, the spot is deflected along a vector $\phi_{1.2}$, shown as being parallel to 1.2, proportionally to the phase-shift measured at dipole 1.2 and along a vector $\phi_{3.4}$, shown to be parallel to 3.4, proportionally to the phase-shift measured at dipole 3.4.

These two vectors are respectively proportional to $\phi_{1.2}$ i.e. to f sin $\theta$, and to $\phi_{3.4}$ i.e. to f cos $\theta$.

Accordingly, the location on the screen of the spot corresponding to the detected sound source has a module proportional to frequency f of the acoustic wave while its argument is the bearing $\theta$ of this source.

Figure 3A:
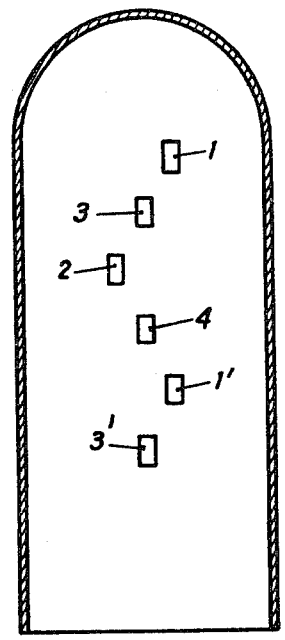
FIGS. 3a and 3b represent, respectively in elevation and in plane, an acoustic head according to the invention.
Figure 3B:
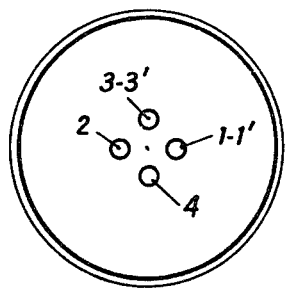
Figure 3C:
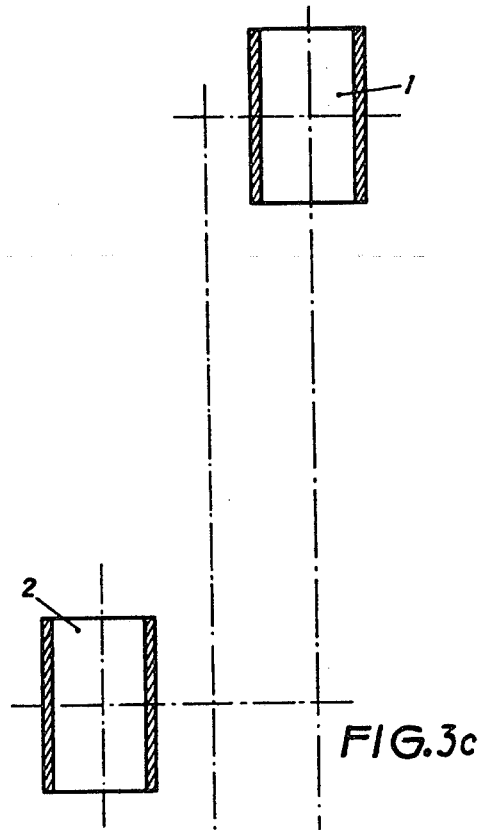
Figure 4:
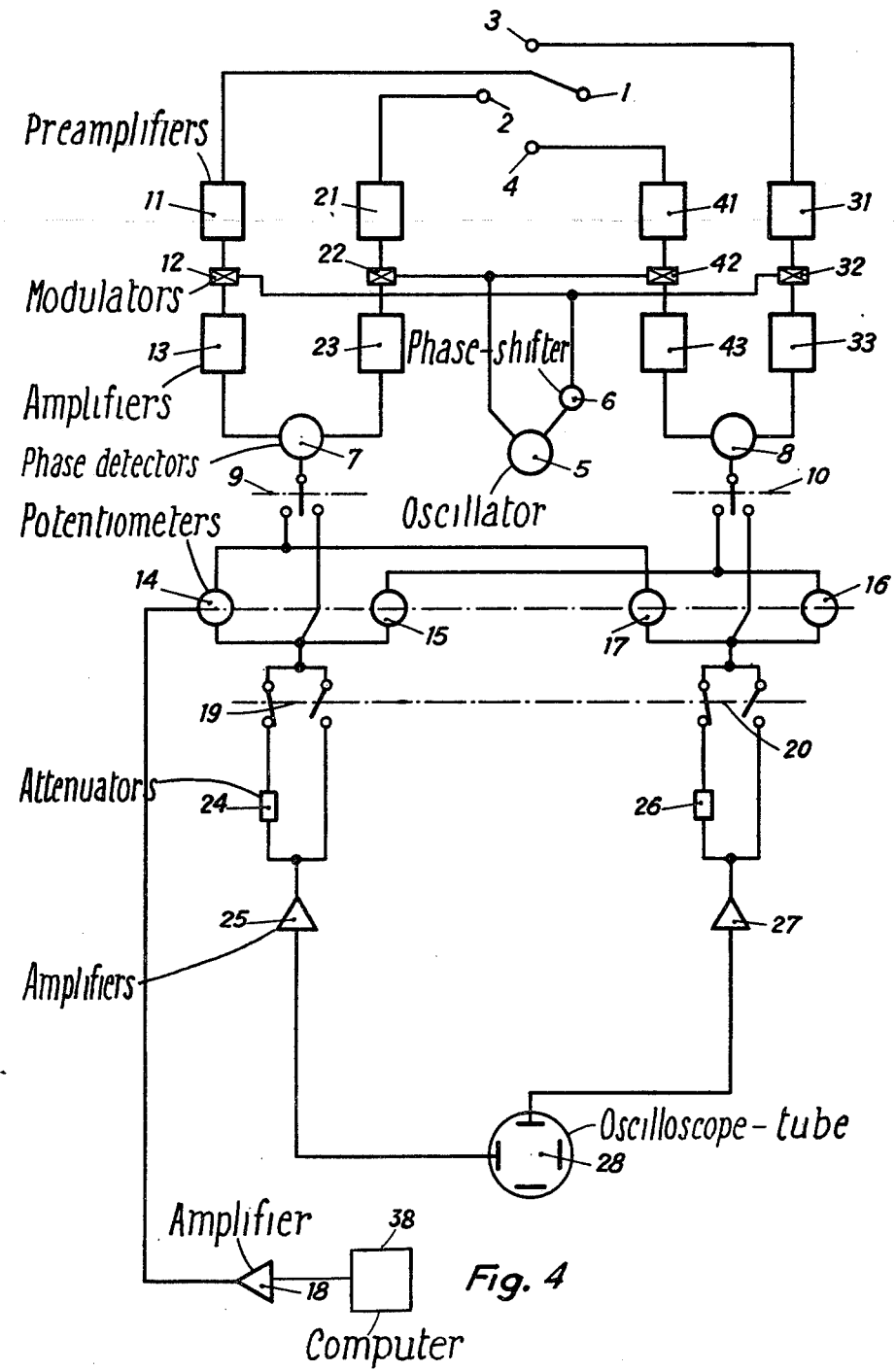
FIG. 4 is a block diagram of a system according to the invention.

FIGS. 3a, 3b, 3c show the acoustic head of a detecting device according to the invention, while FIG. 4 shows in block diagram form the electronic circuit thereof.

The acoustic head comprises two dipoles at right angles to each other, as shown in elevation in FIG. 3a, in plane in FIG. 3b and, on an enlarged scale in elevation, in FIG. 3c.

Dipole 1-2 comprises a first hydrophone 2, forming the first pole, and a second pole formed by two hydrophone elements 1 and 1' having the same axis. This common axis is parallel to the axis of element 2. In the same way, dipole 3-4 comprises a first pole 4 and a second pole comprising two hydrophone elements 3-3'. Elements 1 and 1', 3 and 3' are connected in parallel.

FIG. 3c shows the spacing between the hydrophones 1 and 1' and the spacing of the vertical axis of elements 1-1' with respect to the vertical axis of hydrophone 2.

These spacings are, for example, 200 mm and 37.5 mm. The acoustic head is located in a cylindrically shaped dome, having a diameter of 250 cm, and topped by a spherical portion, the total height of the dome being thus 500 mm.

As will be shown later in the description, these spacings enable the decorrelation of clutter noises between the two poles of each dipole. If the spacing between the two hydrophones of the same pole 1-1' is too large, this pole has its own directivity, and is no longer omnidirectional. A spacing of 200 mm gives a directivity of $\pm 10°$ in the vertical plane at 3 dBs below the maximum, of $\pm 22°$ at a frequency equal to 10,000 cs, at 3 dBs at a frequency equal to 5,000 cs.

The signals derived from the sounds received by the dipole comprising hydrophones 1, 1', are amplified in amplifier 11 and those from dipole comprising hydrophone 2 in amplifier 21. The amplified signals are modulated in modulators 12 and 22, which may be, for example, single side band modulators. The carrier is provided by an oscillator 5, whose frequency is, for example, 30 kc/s. A phase-shifter device 6 provides a phase-shift of $\pi/2$ between the carrier waves, respectively applied to modulators 12 and 22.

The output signals of modulators 12 and 22 are amplified and clipped in channels 13 and 23 respectively and phase detected in a phase detector 7. The output signal is, consequently, a series of periodic square pulses with two different voltage levels, corresponding respectively to the two alternations of the input sinusoidal wave.

The phase shift between two sine waves, can be derived after clipping and amplifying, from the time interval during which the corresponding levels have the same value and this is the purpose of the phase detector 7.

The output voltage of this phase detector is a d.c. voltage which is a linear function of said phase shift. Taking into account the $\pi/2$ phase shift introduced by the phase shifter 6, this voltage is equal to zero for a phase shift between the sine waves equal to 90 /2.

Amplifiers 25 amplifies the signal before it is applied to the oscilloscope tube 28.

The circuit connected to dipole 3-4 is entirely similar. It comprises amplifiers 41 and 31, modulators 42 and 32, channels 43 and 33, a phase detector 8 and an amplifier 27.

The operation of the system shown in FIG. 4 will now be described. The sound wave received has a frequency f comprised, for example, between 2,000 and 10,000 c/s and its direction of propagation is, for example, substantially horizontal.

The dipole comprising hydrophones 1, 1', and 2 will be considered first. It will be noted that in the case of a plane wave derived from a distant source, the sum of the signals received by hydrophones 1 and 1' is equal to that which would be received by a single hydrophone, located midway between hydrophones 1 and 1'.

The spacing between hydrophones 1 and 1' is sufficiently high for the sea clutter noise signals received by hydrophones 1 and 1' not to be correlated with those received by hydrophone 2.

The same is done for the other dipole.

It may be shown, that, for a sufficiently loud sound, with the above indicated phase-shift by $\pi/2$, the output signals of phase detectors 7 and 8 are respectively proportional to:

$$\phi_{1,2} = 2\pi f \cdot (d/c) \cdot \sin\theta$$

and $$\phi_{3,4} = 2\pi f \cdot (d/c) \cdot \cos\theta$$

where:
- d: the horizontal spacing of the two hydrophones of each dipoles;
- c: velocity of the incident wave;
- $\theta$: bearing angle of the sound source.

It may be shown that there will be no ambiguity as to the position of the source if $d < \lambda/4$, $\lambda$ being the shortest wavelength of the received signals. However, distance $\lambda/4$ is too small for preventing any correlation of the noise signals received by the two hydrophones of a dipole. This is why, according to the invention, one of the hydrophones of each dipole is substituted by two similar elements which are spaced from each other.

However, there is in fact no ambiguity.

Figure 5:
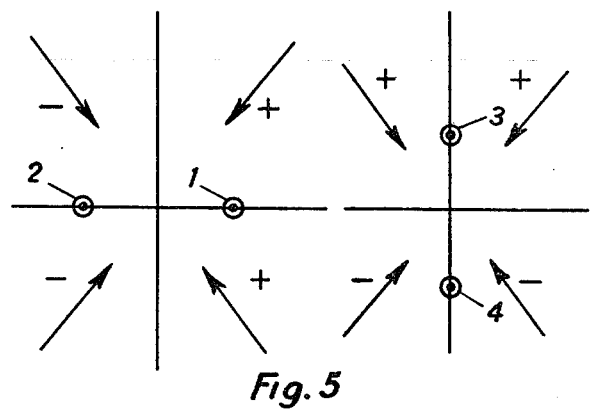
FIG. 5 shows how the ambiguity as to the direction is removed.

This is so, because, the combination of the output signals of the two phase detectors 8 and 9 makes it possible to identify the quadrant which corresponds to the location of the source of sounds; since once is in sin $\theta$ and the other in cos $\theta$ as shown in FIG. 5.

Accordingly the following chart may be drawn:

| Output of Phase detector | Output of Phase detector | Quadrant where the source is located |
|---|---|---|
| + | + | 1 |
| + | − | 2 |
| − | − | 3 |
| − | + | 4 |

The position of the sound source may be determined both in bearing from the ship and in true bearing. If this latter positioning is desired, a bearing corrector system corrects the output of phase detectors 7 and 8 by the bearing of the ship. This system is very diagrammatically shown at 14 to 16 and comprises a computer 38. It is well known in the art and therefore need not be described in this application.

Switches 9 and 10 are provided for connecting the output of phase detectors 7 and 8 to the oscilloscope tube 28 either directly or through the bearing corrector device. Switches 9 and 10 are respectively followed by double pole switches 19 and 20, and attenuators 24 and 26. These attenuators are insert at will, between phase detectors 7 and 8 amplifiers 25 and 27.

Up to this point, it was assumed that the information obtained as to the direction of the incident wave was not influenced by the reflection of the incoming signals on the hull of the boat or any interfering action of the radioelectric assembly.

To minimize this perturbing action the acoustic head is located as far as possible from the hull which may reflect the incoming sonic signals. It will be placed, for example, ahead of the hull or above it.

As to the field distortion due to the dome and to the hydrophones themselves, the resulting error is reduced due to the symmetry of the acoustic head.

It is preferred to keep the modulated carrier at a constant level of the order of 10 volts, for example by means of a compressor device with filtering of the harmonics.

On the whole, the total error in bearing will generally not exceed $\pm 2°$ and may even be lowered to about $\pm 1°$.

Figure 6:
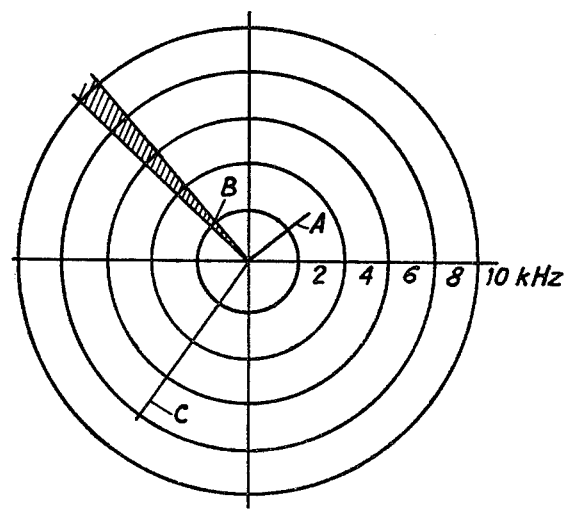
FIG. 6 shows the screen of the oscilloscope tube.

FIG. 6 shows the screen of the oscilloscope tube upon which three signals A, B and C are received.

What is claimed, is:

1. A system for detecting in bearing a source of sound in a predetermined plane and for measuring the frequency of said sound comprising in combination: two hydrophone dipoles substantially arranged in said plane, each having at least two hydrophones, the axis of said dipoles being at right angles to each other said hydrophones receiving said sound and providing output signals these hydrophones having respective axes perpendicular to said plane; means for detecting the respective phase shifts between said output signals of the same dipole and providing phase shift indicating signals; and display means having two inputs for receiving respectively said phase shift indicating signals.

2. A system for detecting in bearing a source of sound in a predetermined plane and for measuring the frequency of said sound comprising in combination: two hydrophone dipoles substantially arranged in said plane said hydrophones receiving said sound and providing output signals the axis of said dipoles being at right angles to each other and these hydrophones having respective axes perpendicular to said plane; said hydrophone dipoles each comprising a first omnidirectional hydrophone, having a first axis, a second and a third omnidirectional hydrophone having a common second axis parallel to said first axis and spaced apart along said second axis; means for detecting the respective phase shifts between said output signals of the same dipole and providing phase shift indicating signals; and display means having two inputs for receiving respectively said phase shift indicating signals.

3. A system for detecting in bearing a source of sound in a predetermined plane and for measuring the frequency of said sound comprising in combination: two hydrophone dipoles substantially arranged in said plane, each having at least two hydrophones and the axis of said dipoles being at right angles to each other, said hydrophones receiving said sound and providing output signals these hydrophones having respective axes perpendicular to said plane; means for detecting the respective phase shifts between said output signals of the same dipole and providing phase shift indicating signals; and a cathode ray tube having two pairs of deflecting means for receiving respectively said phase shift indicating signals.

4. A system for detecting in bearing a source of sound in a predetermined plane and for measuring the frequency of said sound comprising in combination: two hydrophone dipoles substantially arranged in said plane, each having at least two hydrophones and the axis of said dipoles being at right angles to each other, said hydrophones receiving said sound these hydrophones having respective axes perpendicular to said plane; a local oscillator, having a first and a second output; a phase shifter providing a phase shift equal to $\pi/2$ coupled to said second output and having a third output, a first and a second pair of modulators respectively coupled to said dipoles, the modulators of each pair being also coupled to said first and third outputs respectively for providing modulated signals; means for detecting the respective phase shifts between said modulated signals from the same pair of modulators and providing phase shift indicating signals; and display means having two inputs for receiving respectively said phase shift indicating signals.

5. A system for detecting in bearing a source of sound in a predetermined plane and for measuring the frequency of said sound comprising in combination: two hydrophone dipoles substantially arranged in said plane, each having at least two hydrophones, and the axis of said dipoles being at right angles to each other, said hydrophones receiving said sound these hydrophones having respective axes perpendicular to said plane; a local oscillator, having a first and a second output; a phase shifter providing a phase shift equal to $\pi/2$ coupled to said second output and having a third output; a first and a second pair of modulators respectively coupled to said dipoles, the modulators of each pair being also coupled to said first and third outputs respectively for providing modulated signals; means for detecting the respective phase shifts between said modulated signals from the same pair of modulators and providing phase shift indicating signals; potentiometer means for modifying by a predetermined amount the amplitude of said phase shift indicating signals; and display means having two inputs for receiving respectively said phase shift indicating signals thus modified.

* * * * *